Feb. 4, 1958
S. J. BEGIN
2,822,188
SAFETY JACKKNIFE APPARATUS
Filed April 17, 1957
3 Sheets-Sheet 1
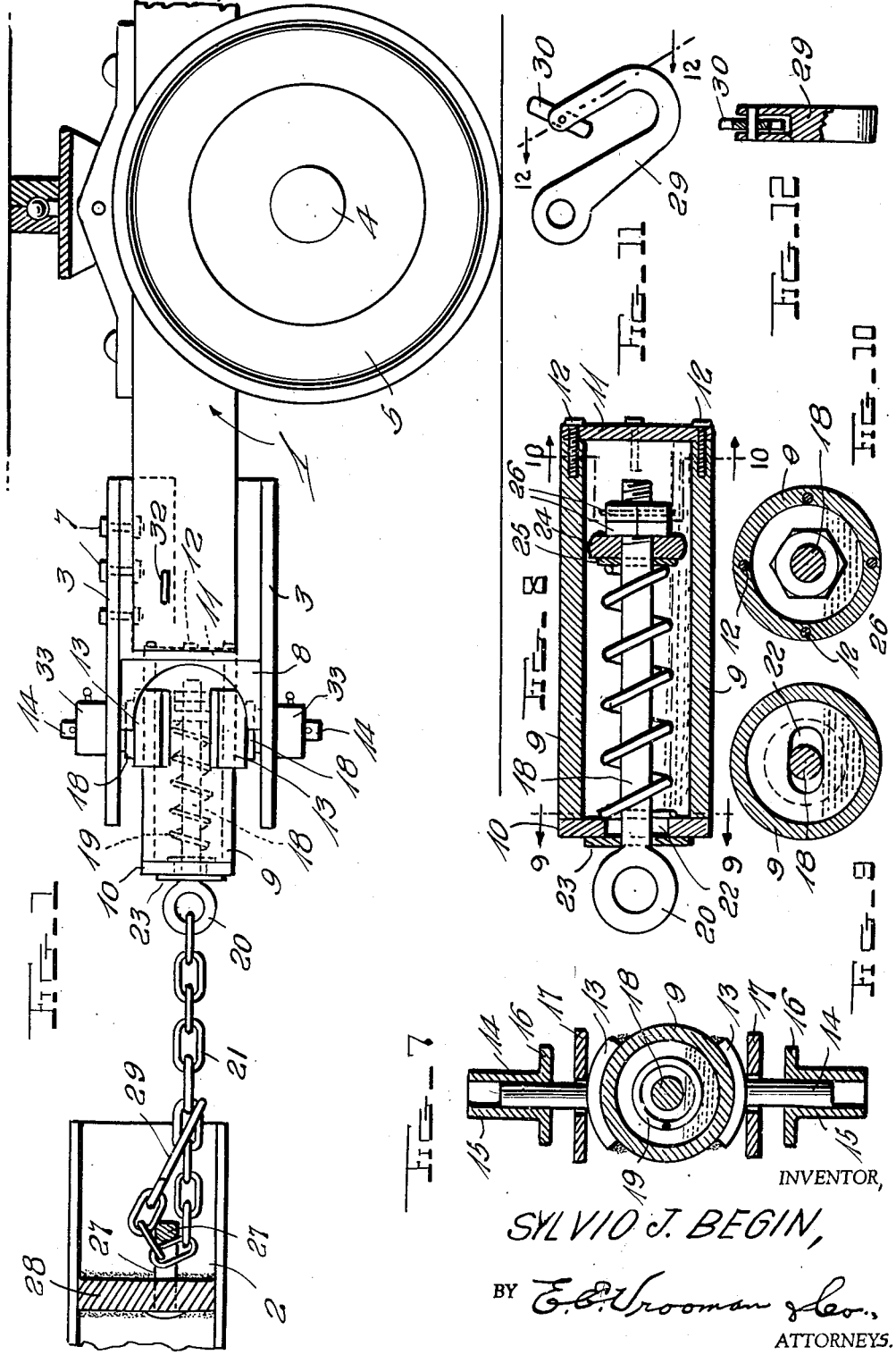
INVENTOR,
SYLVIO J. BEGIN,
BY
ATTORNEYS.

Feb. 4, 1958 S. J. BEGIN 2,822,188
SAFETY JACKKNIFE APPARATUS
Filed April 17, 1957 3 Sheets-Sheet 2
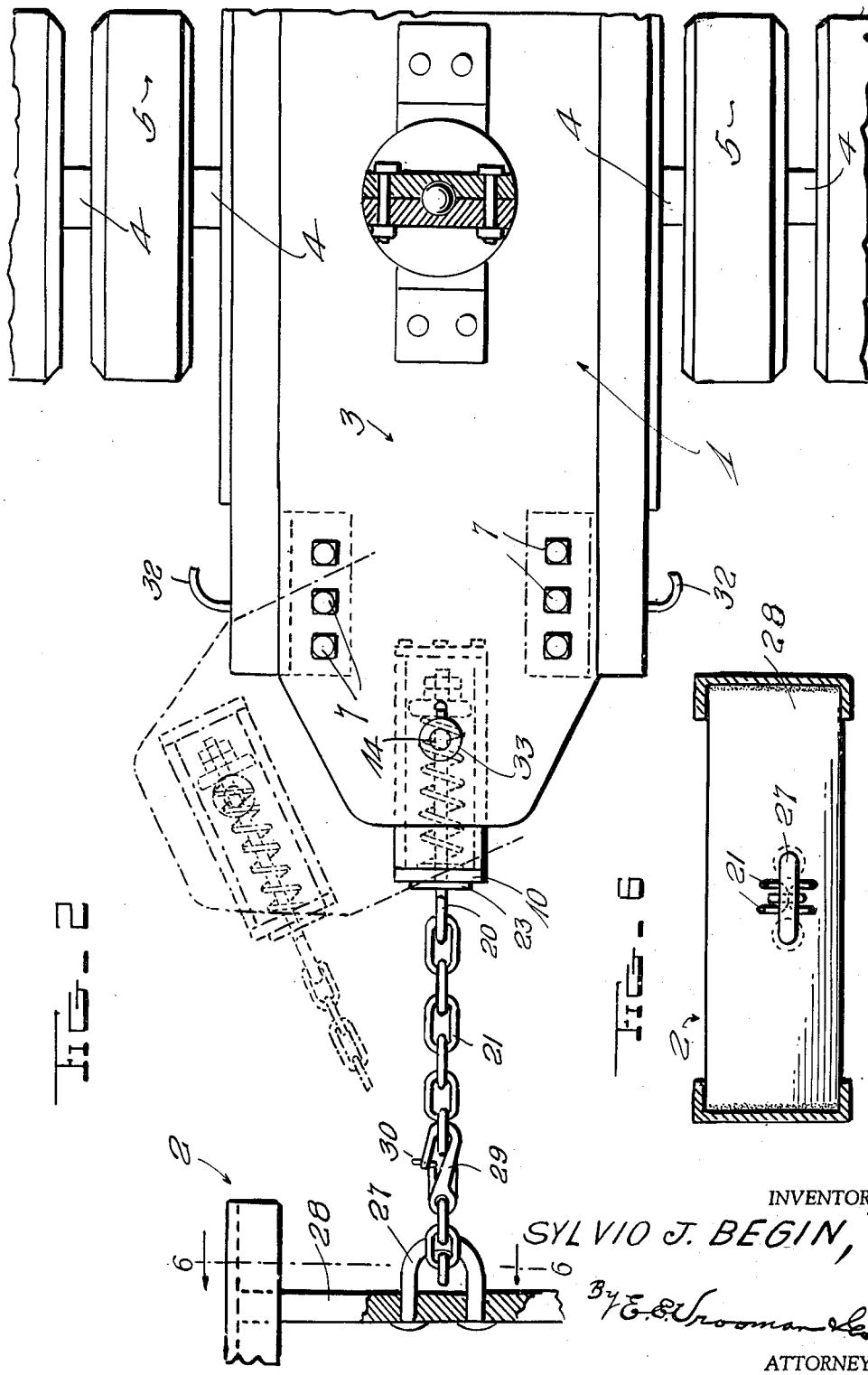
INVENTOR,
SYLVIO J. BEGIN,
ATTORNEYS.

Feb. 4, 1958   S. J. BEGIN   2,822,188
SAFETY JACKKNIFE APPARATUS
Filed April 17, 1957   3 Sheets-Sheet 3
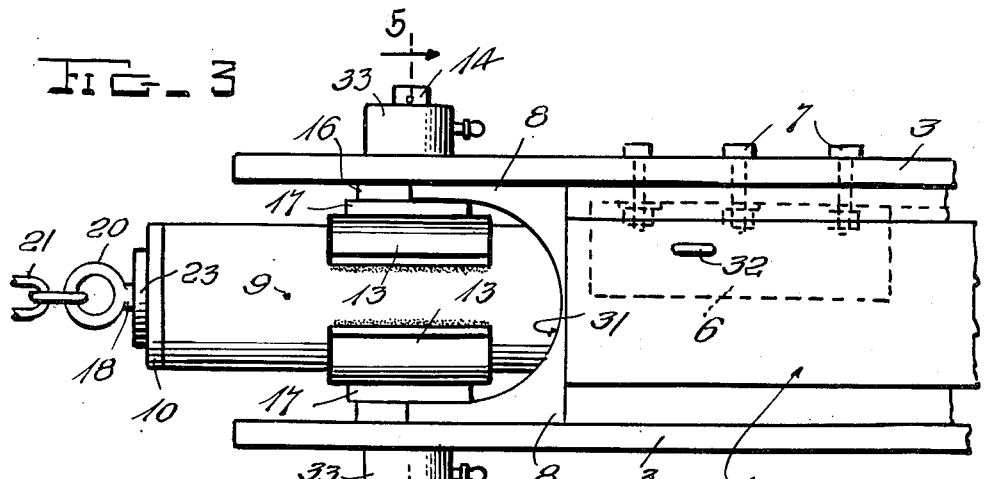
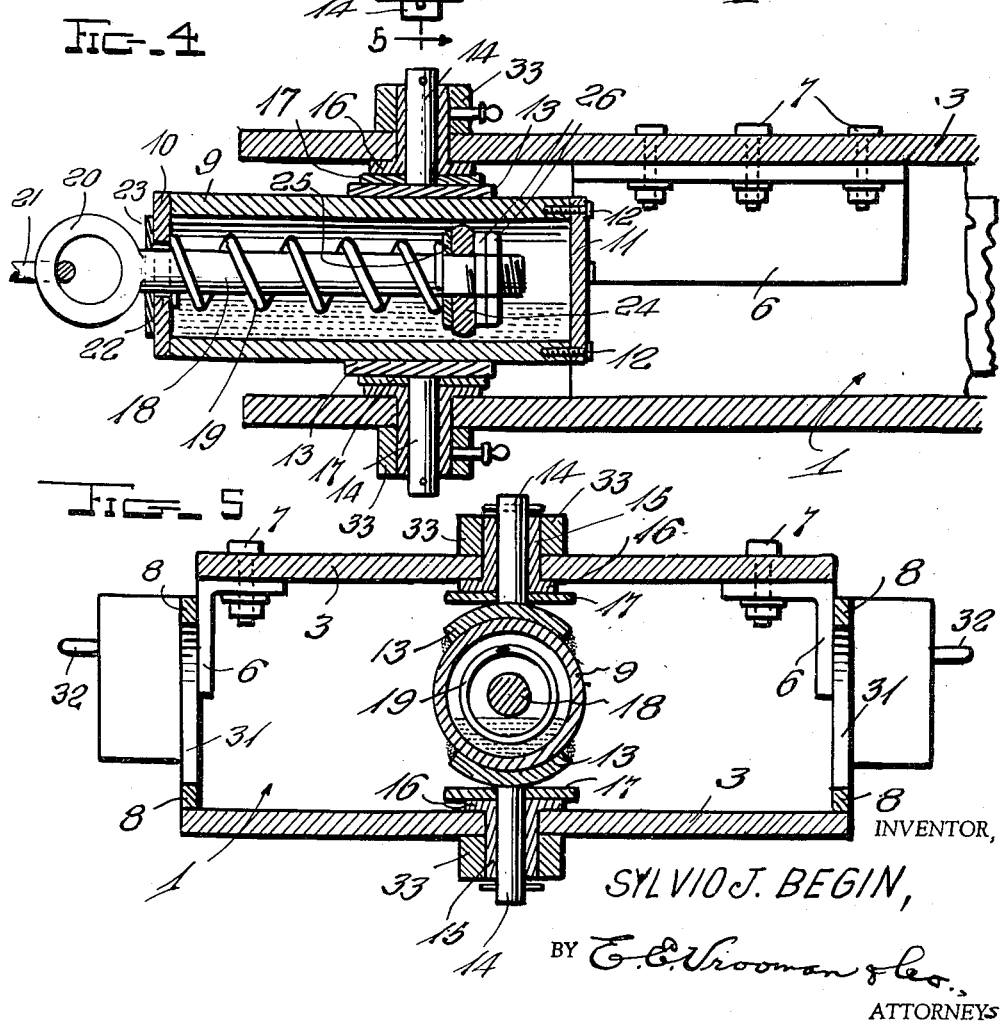
INVENTOR,
SYLVIO J. BEGIN,
BY *[signature]*
ATTORNEYS

United States Patent Office 2,822,188
Patented Feb. 4, 1958

2,822,188

SAFETY JACKKNIFE APPARATUS

Sylvio Joseph Begin, Schenectady, N. Y., assignor to K-W Mfg., Inc., Schenectady, N. Y., a corporation of New York Application April 17, 1957, Serial No. 653,411

3 Claims. (Cl. 280—432)

This invention relates to a mechanical safe-sure mechanism to be used by manufacturers, owners, and operators of towing vehicles or tractors and trailers.

The object of this invention is to prevent the jackknifing of a towing vehicle or tractor and a trailer when connected by a conventional fifth wheel arrangement, as well as providing added protection in preventing the trailer from breaking away from the towing vehicle or tractor.

Another object of the invention is to provide an efficient apparatus which will result in safer highway travel, whereby traffic will be comparatively free of accidents.

A further object of the invention is to provide novel and efficient means for connecting a towing vehicle or tractor to a trailer which comprises a minimum number of efficient elements for accomplishing the desired result.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view in side elevation, and partly in section, of the apparatus constructed in accordance with this invention.

Figure 2 is partly a plan view of the apparatus, showing some of the elements of the apparatus in section.

Figure 3 is an enlarged detailed fragmentary view in side elevation of the apparatus, while Figure 4 is a longitudinal vertical sectional view thereof.

Figure 5 is a transverse sectional view, taken on line 5—5, Figure 3, and looking in the direction of the arrows.

Figure 6 is a transverse sectional view taken on line 6—6, Figure 2, and looking in the direction of the arrows.

Figure 7 is a transverse sectional view of the parts about to be assembled as shown partly on line 5—5, Figure 3.

Figure 8 is a longitudinal sectional view of the cylinder and the parts contained therein.

Figure 9 is a transverse sectional view taken on line 9—9, Figure 8, and looking in the direction of the arrows.

Figure 10 is a transverse sectional view taken on line 10—10, Figure 8, and looking in the direction of the arrows.

Figure 11 is a view in side elevation of the grab hook, while

Figure 12 is a sectional view taken on line 12—12, Figure 11, and looking in the direction of the arrows.

Referring to the drawings by numerals, 1 designates a towing vehicle or truck, while 2 designates a trailer. The towing vehicle 1 comprises a frame 3. The towing vehicle 1 is provided with an ordinary axle 4, on which is mounted at each side of the apparatus a pair of tractor wheels 5.

On the frame 3 (Figs. 3 and 4) are angle brackets 6, which are secured in place by means of bolts 7. End closures 8 are mounted on said angle brackets 6.

The cylinder 9 (Figs. 3 and 4) is closed at its outer end by a suitable disc or plate 10 that is preferably welded or otherwise secured to the outer end of the cylinder, and a disc or plate 11 is secured preferably by bolts 12 to the inner end of the cylinder 9 (Fig. 4). Mounted on the outer surface of the cylinder 9, and preferably permanently secured to said cylinder are semi-circular shoes 13 (Fig. 5). Extending from each shoe 13 is a pin 14, which pins 14 extend in opposite directions. A brass bushing 15 is mounted on each pin 14. Each bushing 15 has an annular flange 16 on its inner end, and this flange fits against an annular washer 17, which washer normally engages shoe 13; this structure is similar to that on the opposite side of the cylinder 9 (Fig. 5).

A bolt 18 extends into the cylinder 9 and within said cylinder, and extending around the bolt 18 is a strong coil spring 19. This spring 19 presses against the outer end of the cylinder. The bolt 18 is provided with an eye 20 at its outer end, in which eye is secured the inner end of the chain 21. The bolt 18 extends through elongated aperture 22 (Fig. 9), which aperture is closed by a plate or washer 23 against leakage of a lubricant from the cylinder 9, if the operator places a lubricant in said cylinder.

On the bolt 18, near its inner end, is a strong washer 24 against one side of which is a small washer 25, against which washer 25 the inner end of the coil spring 19 presses. Near the extreme inner end of the bolt 18 are two lock nuts 26.

A U-bolt 27 is mounted on reinforcement cross-member 28 of the trailer 2. The chain 21 has a grab hook 29 which is suitably attached to the outer end of the chain (Fig. 1) and is used to anchor the trailer close to the towing vehicle or truck as shown. The grab hook 29 is provided with a pivoted locking tongue 30, which serves to hold the link of the chain in a locked position when the chain and the grab hook are assembled.

The frame 3 of the towing vehicle is cut-away at 31 to permit pivotal movement of the cylinder 9 when it is swung from side to side.

On the towing vehicle 1 are preferably two hooks 32 which are provided for hooking the chain 21 thereon when the operator desires.

On the brass bushings 15 are nut-like units 33 (Fig. 4 and 5).

The alemite fittings are located on each side of the cylinder, and one on each housing for the pivot pin.

It is to be understood that the load being carried by the trailer will determine the size, specification of the spring, eyebolt, cylinder, chain, and grab hook, etc.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such alterations or changes as shall fairly fall within the scope of the appended claims.

What I claim is:

1. In an apparatus of the class described, the combination with a towing vehicle frame and a trailer, of a pivotally mounted cylinder partly positioned within said frame, semicircular shoes on opposite sides of said cylinder, each shoe provided with an integral pin, bushings on said pins, each bushing provided with an integral flange, washers on said pins and positioned between said integral flanges and said shoes, a bolt in said cylinder, and means connecting said bolt to said trailer.

2. In an apparatus of the class described, the combination with a towing vehicle frame, of a cylinder provided at opposite sides with semicircular shoes permanently secured to said cylinder, each shoe provided with an outwardly-extending pin, a bushing provided on its inner end with a flange mounted on each pin and extending through said frame, a washer mounted on each pin and positioned between the flange of said bushing and a shoe, said cylinder closed at its outer end, said outer closed end being provided with a horizontally elongated aperture, a bolt provided with an eye on its outer end slidably mounted in said horizontally elongated aperture, a coil spring on said bolt, said bushing pivotally mounted in and extending through said frame, a pair of washers on said bolt at the inner end of said spring, a pair of lock nuts at the inner end of said bolt, and a towing chain mounted in the eye of said bolt.

3. In an apparatus of the class described, the combination with a towing vehicle and a trailer, said towing vehicle provided with a frame, of angle brackets on said frame, closure means on said angle brackets, a cylinder pivotally mounted on said frame between said angle brackets, a bolt provided with a coil spring in said cylinder, and means detachably connecting said bolt to said trailer.

References Cited in the file of this patent

UNITED STATES PATENTS

| | | |
|---|---|---|
| 1,404,678 | Amonsen | Jan. 24, 1922 |
| 1,654,939 | Loebs | Jan. 3, 1928 |
| 1,908,711 | Kuchar | May 16, 1933 |
| 2,698,189 | Finch | Dec. 28, 1954 |

FOREIGN PATENTS

| | | |
|---|---|---|
| 436,907 | Great Britain | Oct. 21, 1935 |